US006653939B2

(12) United States Patent
Galloway

(10) Patent No.: US 6,653,939 B2
(45) Date of Patent: Nov. 25, 2003

(54) MULTIPURPOSE DETECTOR

(75) Inventor: John Lindsay Galloway, Towcester (GB)

(73) Assignee: Infrared Integrated Systems Limited, Northants (GB)

( * ) Notice: Subject to any disclaimer, the term of this patent is extended or adjusted under 35 U.S.C. 154(b) by 0 days.

(21) Appl. No.: 09/912,242

(22) Filed: Jul. 23, 2001

(65) Prior Publication Data
US 2002/0043623 A1 Apr. 18, 2002

(30) Foreign Application Priority Data
Jul. 21, 2000 (GB) .............................. 0018045

(51) Int. Cl.$^7$ ............................................ G08B 13/08
(52) U.S. Cl. .................... 340/545.3; 340/555; 340/556
(58) Field of Search ................. 340/521, 555, 340/556, 567, 578, 600, 630, 545.3, 577, 584; 250/338.1, 338.3, 339.02, 339.14, 339.15

(56) References Cited
U.S. PATENT DOCUMENTS 4,052,716 A   10/1977  Mortensen .................. 340/552
4,245,217 A * 1/1981  Steinhage .................. 340/555
4,775,853 A   10/1988  Perez Borruat ............. 340/521
5,311,024 A * 5/1994  Marman et al. ............ 250/353
5,420,567 A * 5/1995  Schwarz ..................... 340/521
5,486,810 A * 1/1996  Scgwarz ..................... 340/521
5,800,360 A * 9/1998  Kisner et al. ............... 600/532
6,229,913 B1 * 5/2001  Nayar et al. ................ 382/154
6,239,433 B1 * 5/2001  Porter ...................... 250/338.3
6,476,859 B1  11/2002  Galloway et al. ........... 348/164
6,528,788 B1  3/2003  Galloway ................... 250/332

FOREIGN PATENT DOCUMENTS

EP   0 853 237 A1  7/1998  ........... G01J/5/34
GB   2 340 222 A   2/2000  ........ G08B/13/194

OTHER PUBLICATIONS

Search Report for GB No. 0018045.5, dated Nov. 14, 2000.

* cited by examiner

Primary Examiner—Van Trieu
(74) Attorney, Agent, or Firm—Moser, Patterson & Sheridan, L.L.P.

(57) ABSTRACT

A method and apparatus for an event detector using an array of passive infrared detector elements, which uses interchangeable spectral filters and lenses to permit detection of a range of event types, which normally each require individual detectors with specific spectral/optical designs.

14 Claims, 2 Drawing Sheets

MULTIPURPOSE DETECTOR

BACKGROUND OF THE INVENTION

1. Field of the Invention

The present invention relates to a multipurpose detector for detecting a number of different types of event.

2. Description of the Related Art

It is known that passive infrared detectors can be used for detecting flames by detecting emissions from hot carbon dioxide using a narrow bandpass filter centered on a wavelength of 4.3 $\mu$m. By using an array of detector elements, spatial information can be obtained which permits additional information, such as the size and location of the flames, to be deduced.

Furthermore, by analyzing signals from different parts of the spectrum, the performance of a flame detector can be enhanced. Typically, this is implemented by using up to three discrete detectors, each with a filter sensitive to an appropriate part of the spectrum.

It is also known that when fitted with a 5.5 $\mu$m long wave pass filter a passive infrared detector can be used to detect people. By using an array of detector elements, as in the case of the flame detector described above, spatial information can be obtained which permits additional information such as the number and location of people in the field of view, to be obtained. In addition, the detection of people can be used in a range of specific applications, e.g. door opener, intruder detector or activity monitor, by using different algorithms to implement the particular detection requirements in each case.

There has been long-term interest in detectors capable of detecting both fires and people, but the optical requirements of each of the conventional detector types have made this impractical, such that different detectors are typically used in each case.

SUMMARY OF THE INVENTION

The present invention provides a multipurpose detector comprising:

an array of passive infrared detector elements;

optical collection means for focusing broadband radiation from a scene onto the array;

means for processing signals from the detector elements; and filtering means providing a filter configuration allowing only a narrower range of radiation within a broadband to reach the detector elements and having means for moving the filter configuration to or from an operative position between the array and the scene, wherein the means for moving the filter configuration is operated in response to a control signal from the means for processing signals.

Preferably, the filtering means provide two or more filter configurations selectable to allow different ranges of radiation to reach the detector elements. In a preferred embodiment, the selection of different ranges of wavelengths allows performance benefits to be obtained by examining different parts of the spectrum, without the need to use multiple arrays, with the inherent cost penalty and difficulties of alignment. By processing the signals from the array appropriately, it is possible to use selectable spectral information in conjunction with the spatial information from the array to provide additional functionality compared with a conventional array-based detector. For example, the combination of spatial and spectral information may be used to detect fires that are not generating flames.

In addition, in a preferred embodiment, a single detector may be used to detect entirely different events such as the presence of people and fires, by selecting different filter configurations together with appropriate signal processing and detection algorithms in each case. Such a device may be selected to operate either as a fire detector or a people detector at a particular time, or otherwise may be operable to continuously scan for both fires and people. In a further embodiment, the spatial information may be used to distinguish between allowable and unallowable events, such as the presence of fires and/or people, in particular areas of the scene.

The detector array itself typically comprises a planar or substantially planar array of individual passive infrared detector elements, which may be pyroelectric detector elements. The broadband radiation permitted to pass onto the array by the optical collection means typically comprises at least the range of wavelengths capable of being detected by the detector elements being used. For passive infrared detectors, this broadband radiation is generally within the wavelength range of 2 $\mu$m to 20 $\mu$m.

In a particularly preferred embodiment, the filter configuration is selectable in response to a control signal generated by the signal processing means. This signal may effect implementation of the available filter configurations sequentially, or may alternatively cause the selection of a particular filter configuration which may enable more information to be determined about an event occurring in the scene or enable confirmation of the type of such an event.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
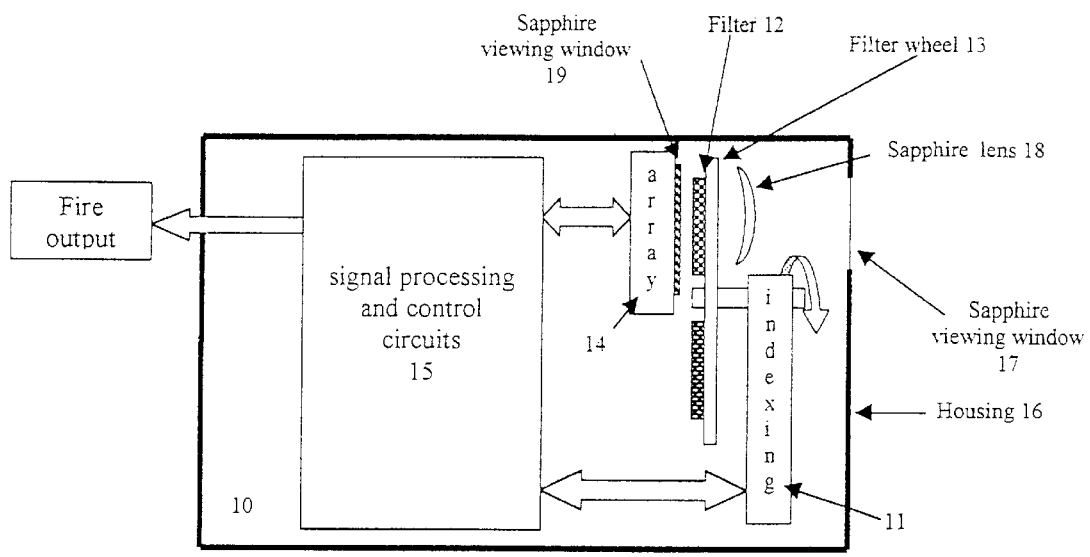
FIG. 1 shows schematically a fire detector having a selection of different filter configurations.

Referring to FIG. 1, a fire detector 10 is shown, in which an indexing mechanism 11 is used to bring different spectral filters 12, which are mounted on a rotatable wheel 13, in front of an array 14 of detector elements. The detector 10 further comprises a signal processing and control unit 15 which receives signals from the detector array 14 and which also controls the indexing mechanism 11, preferably in dependence on the signals received from the detector array. The unit 15 also outputs a signal that contains information relating to the detection of fires. This signal may simply indicate the presence of a fire within the scene, or may contain further information regarding, for example, the location of a fire within the scene or the spread of a fire.

The detector is enclosed in a housing 16 which has a sapphire viewing window 17 which allows radiation from the scene to pass into the detector and onto the array 14 via a sapphire lens 18 and the selected filter 12. The window 17 provides environmental protection without affecting the transmission of radiation in the part of the spectrum that is of interest, and a similar window 19 is also provided to protect the array itself.

The lens 18 is positioned between the viewing window 17 and the selected filter 12, but could equally be positioned between the filter and the array. The lens is positioned to provide the appropriate field of view, and the material of the lens is chosen to allow radiation of the required range of wavelengths to reach the array. In this case, the lens is made of the same material as the viewing window 17, i.e. sapphire.

In this embodiment, the spectral filter is selected by means of the indexing mechanism 11 which positions the appropriate filter in front of the array. The rotatable wheel used in the embodiment of FIG. 1 could be replaced by other suitable means for positioning the filters, which may use, for example, a reciprocating motion to change filters.

Figure 2:
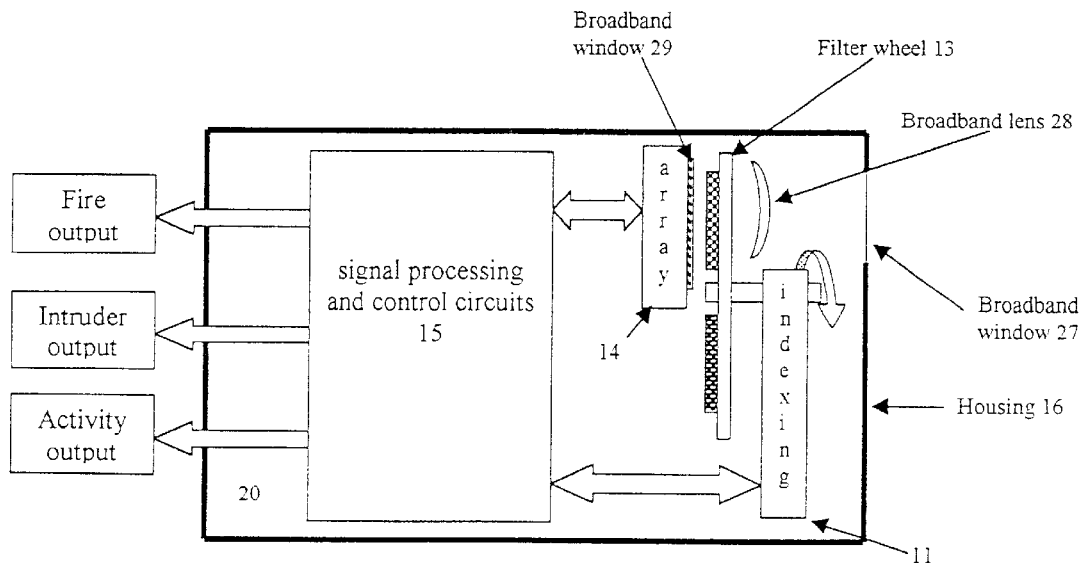
FIG. 2 shows a combined fire and people detector.

The different filters are chosen to allow activity in relevant portions of the spectrum to be more closely observed and analyzed. By way of a further development, FIG. 2 shows a detector 20 similar to that of FIG. 1, in which the filters are chosen to allow events other than the presence of fire to be detected and analyzed. (In FIGS. 2 and 3, identical reference numerals to those in FIG. 1 indicate identical components which will not be described again). In the embodiment of FIG. 2, the windows 27, 29 are broadband windows, and the lens 28 is a broadband lens made of a similar material to the windows. The lens 28 may be made of germanium covered with an anti-reflective coating. The indexing mechanism has at least three positions: a 5.5 $\mu$m long-wave pass filter, a 4.3 $\mu$m bandpass filter and an open position allowing radiation of all wavelengths passing through the windows 27, 29 and lens 28 to be seen by the array. Only the first two of these positions are shown in FIG. 2.

The particular filters used in the embodiment of FIG. 2 enable the detector to be used as both fire detector and a people detector. Correspondingly, different outputs are provided, as shown, for these different functions. In addition, the function of people detection can be further divided into intruder detection and activity monitoring, by using different signal processing techniques appropriate to each of these functions, even when using the same 5.5 $\mu$m filter. As shown in FIG. 2, separate outputs may then be provided for the intruder detector and the activity monitor functions.

A typical mode of operation of the detector of FIG. 2 will now be described. In normal operation the mechanism is in the "broadband" position, so that the array can detect any changes in incident radiation in either the flame or people detection portions of the spectrum. All changes in radiation are analyzed by the signal processing and a decision made as to the most likely cause of this change, and the appropriate spectral filter is moved in front of the array. The decision-making processing may require a check to be made in another part of the spectrum. In this case the indexing mechanism is used to bring the alternative filter in place, and the resulting signals are processed to confirm or reject the decision of the first analysis.

For example, in the broadband position features indicative of flame flicker may be detected in the scene. In response to this, the control unit could select a 4.3 $\mu$m filter and check the relative amplitude of the detected flicker to confirm whether the flicker is indeed occurring in the portion of the spectrum associated with flame detection. Other filters could be selected to try to confirm that the source is a flame, or to isolate the likely cause of the detected signal.

Similarly, signals indicative of the presence of people may be detected in the broadband position. This first analysis could be made on the basis of characteristic signal amplitudes and spatial information being detected in the broadband position, and could be confirmed by examining the relative amplitude of the signals when filtered through a 5.5 $\mu$m filter.

Alternatively, it may not be necessary to perform any detailed "first analysis", and the detector could simply begin to cycle through a range of different filters in response to the detection of any significant activity in the broadband position. Significant activity could be defined as any signal from a detector element being above a predetermined threshold, possibly for a given period of time, or a particular number of such signals being received from different elements. Using this system of cycling through different filters, the relative amplitudes of the detected signals in different portions of the spectrum may be examined to determine the likely nature of the event occurring within the scene. Other information, for example spatial information, may also be taken into account. The cycling of filters may be stopped, and a particular filter selected, once a satisfactory identification of the event has been established, in order to monitor the event in more detail.

In certain applications, it may alternatively be desirable to cycle the filters continuously in order to obtain continual information from different parts of the spectrum, or to cycle the filters continuously but only perform analysis of the received signals at particular times corresponding to the selection of particular filters.

Figure 3:
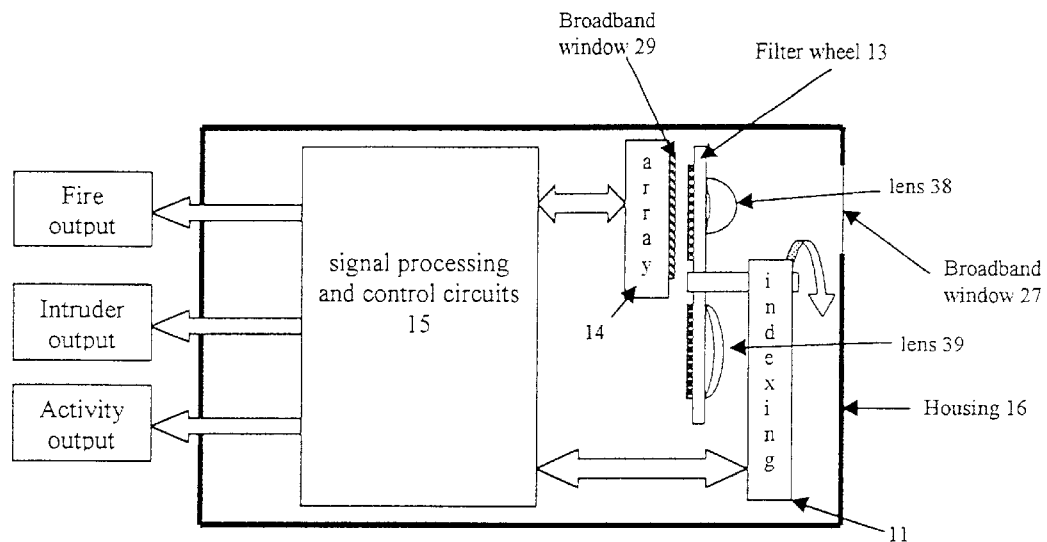
FIG. 3 shows a further embodiment of a combined fire and people detector.
Figure 4:
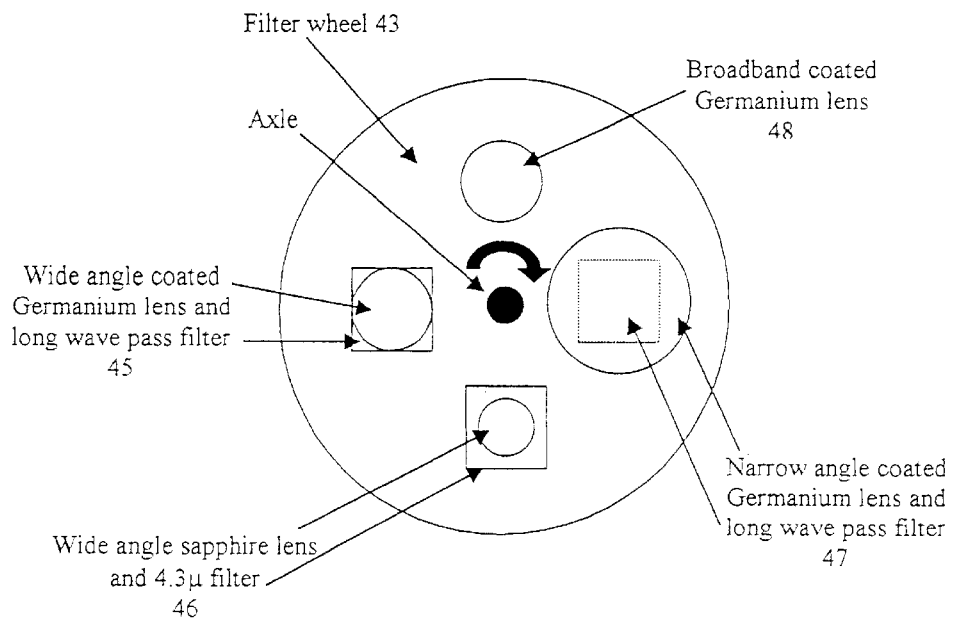
FIG. 4 shows in more detail an arrangement of filters and lenses used in the embodiment of FIG. 3.

In some applications it may be preferable to modify the field of view between applications. This can be achieved as shown in FIG. 3, where the fixed lens has been removed and lenses 38, 39 to suit each application have been attached to the filter wheel 13. FIG. 4 shows a filter wheel 43 with four positions; three fitted with filter/lens combinations 45, 46, 47 and the fourth being fitted with a broadband lens 48 only. The fourth position is equivalent to the open position of the filter wheel in the embodiment of FIG. 2, and is the default position for this arrangement.

The filter/lens combinations in the filter wheel of FIG. 4 are a wide angle coated germanium lens with long wave pass filter 45, a wide angle sapphire lens with 4.3 $\mu$m filter 46 and a narrow angle coated germanium lens with long wave pass filter 47.

It will be appreciated that any combination of filters may be used to make up the appropriate filter configurations used in the invention, or the filtering means may comprise a single element operable to transmit two or more different ranges of radiation. For example, a single filter may be used that provides band pass over two parts of the spectrum, corresponding to the two guard bands often used in flame detection.

Typically, when detecting the presence of flames, the passage of radiation is restricted to wavelengths in the range 2.5 $\mu$m to 6.0 $\mu$m, and possibly between 3.5 $\mu$m and 4.5 $\mu$m, and when detecting people, to wavelengths between 5.5 $\mu$m and 15 $\mu$m.

While the foregoing is directed to embodiments of the present invention, other and further embodiments of the invention may be devised without departing from the basic scope thereof, and the scope thereof is determined by the claims that follow.

What is claimed is:

1. A multipurpose detector comprising:
    an array of passive infrared detector elements;
    optical collection means for focusing broadband radiation from a scene onto the array;
    means for processing signals from the detector elements; and
    filtering means providing a filter configuration allowing only a narrower range of radiation within a broadband to reach the detector elements and having means for moving the filter configuration to or from an operative position between the array and the scene, wherein the means for moving the filter configuration is operated in response to a control signal from the means for processing signals, wherein the control signal is generated by the means for processing signals in dependence on signals received from elements of the array.

2. The detector of claim 1, wherein the filtering means provides two or more filter configurations selectable to allow different ranges of radiation to reach the detector elements.

3. The detector of claim 2, wherein the filter configuration is selectable in response to the control signal from the means for processing signals and wherein, in response to the control signal, the available filter configurations are implemented one after another.

4. The detector of claim 2, wherein the filter configuration is selectable in response to the control signal from the means for processing signals and wherein, in response to the control signal, an appropriate filter configuration is selected.

5. The detector of claim 1, wherein the means for processing signals comprises means for detecting a presence of an event within the scene and identifying a nature of the event, on the basis of the signals from the detector elements of the array.

6. The detector of claim 5, wherein the filter configuration is selectable in response to the control signal from the means for processing signals and wherein the means for processing signals generates the control signal on the basis of the nature of a detected event.

7. The detector of claim 6, wherein the filter configuration is selected such that a range of radiation permitted to pass from the scene to the array is characteristic of the detected event.

8. The detector of claim 5, wherein the means for processing signals comprises means for detecting a presence of flames within the scene, and in response to the detection of flames, a filter configuration is selected restricting the passage of radiation to wavelengths in a range of 2.5 $\mu$m to 6.0 $\mu$m.

9. The detector of claim 5, wherein the means for processing signals comprises means for detecting a person within the scene, and in response to the detection of the person, a filter configuration is selected restricting a passage of radiation to wavelengths between 5.5 $\mu$m and 15 $\mu$m.

10. The detector of claim 1, wherein the filtering means comprises two or more filter elements, each of which transmits a narrow range of radiation within the broadband.

11. The detector of claim 1, wherein the filtering means comprises a single element operable to transmit two or more different ranges of radiation.

12. The detector of claim 1, wherein a plurality of selectable optical collection means is provided.

13. The detector of claim 12, wherein respective optical collection means are provided for each filter configuration.

14. The detector of claim 13, wherein the optical collection means are arranged to be selectable together with the filtering means.

* * * * *